(12) United States Patent
Brickwood et al.

(10) Patent No.: US 10,287,993 B2
(45) Date of Patent: May 14, 2019

(54) METHOD AND DEVICE FOR COMBUSTION WITH PULSED FUEL SPLIT

(71) Applicant: Siemens Aktiengesellschaft, München (DE)

(72) Inventors: Gavin Brickwood, Lincoln (GB); Ghenadie Bulat, Lincoln (GB)

(73) Assignee: SIEMENS AKTIENGESELLSCHAFT, München (DE)

( * ) Notice: Subject to any disclaimer, the term of this patent is extended or adjusted under 35 U.S.C. 154(b) by 0 days.

(21) Appl. No.: 15/666,607

(22) Filed: Aug. 2, 2017

(65) Prior Publication Data
US 2017/0328284 A1 Nov. 16, 2017

Related U.S. Application Data

(62) Division of application No. 13/879,056, filed as application No. PCT/EP2011/067172 on Sep. 30, 2011, now Pat. No. 9,822,710.

(30) Foreign Application Priority Data

Oct. 13, 2010 (EP) ..................................... 10187429

(51) Int. Cl.
*F02C 9/28* (2006.01)
*F23N 5/24* (2006.01)
*F23R 3/34* (2006.01)

(52) U.S. Cl.
CPC ................ *F02C 9/28* (2013.01); *F23N 5/242* (2013.01); *F23R 3/34* (2013.01); *F23R 3/343* (2013.01); *F23N 2041/20* (2013.01); *F23R 2900/00013* (2013.01); *F23R 2900/03281* (2013.01)

(58) Field of Classification Search
CPC .... F02C 9/263; F02C 9/30; F02C 9/32; F02C 9/28; F02C 9/40; F02C 9/42; F02C 9/44; F02C 9/46; F02C 7/232; F23R 3/28; F23R 3/36
See application file for complete search history.

(56) References Cited

U.S. PATENT DOCUMENTS

| 4,735,052 | A | * | 4/1988 | Maeda | ...................... | F02C 9/28 |
| | | | | | | 60/733 |
| 2003/0110777 | A1 | * | 6/2003 | O'Connor | ................. | F02C 7/26 |
| | | | | | | 60/778 |
| 2004/0255594 | A1 | * | 12/2004 | Baino | ....................... | F02C 9/26 |
| | | | | | | 60/773 |
| 2008/0134684 | A1 | | 6/2008 | Umeh et al. | | |
| 2009/0133379 | A1 | * | 5/2009 | Mendoza | .................. | F23N 5/00 |
| | | | | | | 60/39.281 |
| 2010/0199680 | A1 | * | 8/2010 | Nomura | .................... | F02C 9/28 |
| | | | | | | 60/773 |

* cited by examiner

*Primary Examiner* — Craig Kim

(57) ABSTRACT

A method of operating a control unit for controlling at least two different input fuel flows to a combustion device, e.g. a gas turbine includes the step of determining on the basis of at least one operating parameter whether the combustion device is in a predefined operating stage. In response hereto, generating a control signal configured for setting a ratio of at least two different input fuel flows to a predetermined value (psc1, psc3) for a predetermined time (dt) in case the combustion device is in the predefined operating stage.

8 Claims, 3 Drawing Sheets

METHOD AND DEVICE FOR COMBUSTION WITH PULSED FUEL SPLIT

CROSS REFERENCE TO RELATED APPLICATIONS

This application is the US Divisional Application of US National Stage Application 13/879,056, filed Apr. 12, 2013 of International Application No. PCT/EP2011/067172, filed Sep. 30, 2011 and claims the benefit thereof. The International Application claims the benefits of European application No. 10187429.5 filed Oct. 13, 2010. All of the applications are incorporated by reference herein in their entirety.

FIELD OF INVENTION

The present invention relates to the field of combustion devices and in particular to combustion devices in the form of gas turbines.

BACKGROUND OF INVENTION

WO 2007/082608 A1 relates to a control arrangement which detects a temperature sensor output and, depending on that sensor output, varies the fuel supplies within the burner in such a way as to maintain the temperature of a component part below a maximum value, while keeping the fuel in incoming fuel supply line substantially constant.

In view of the above-described situation, there exists a need for an improved technique that enables to provide a combustion device, while substantially avoiding or at least reducing one or more problems of known systems.

SUMMARY OF INVENTION

This need may be met by the subject matter according to the independent claims. Advantageous embodiments of the herein disclosed subject matter are described by the dependent claims.

According to a first aspect of the invention there is provided a combustion device control unit comprising (i) a control input for receiving at least one operating parameter indicative of the operation of a combustion device; (ii) a control output for outputting a control signal for controlling at least two different input fuel flows to the combustion device; (iii) wherein the control unit is configured for determining on the basis of the at least one operating parameter whether the combustion device is in a predefined operating stage; (iv) and wherein the control unit is further configured for generating the control signal so as to set the ratio of the at least two different input fuel flows to a predetermined value for a predetermined time in case the combustion device is in the predefined operating stage.

This aspect of the invention is based on the findings of the inventors that by setting the ratio of the at least two different input fuel flows to a predetermined value for a predetermined time surprisingly results in a "smoother" operation of the combustion device compared to known control algorithms and can reduce a temporary increase or overshoot of nitrogen oxide (NOx) emissions. Generally herein NOx stands for oxides of nitrogen as the chemical compounds NO and $NO_2$.

According to an embodiment, the combustion device is a gas turbine or is a combustor comprised in a gas turbine engine. According to a further embodiment, the combustion device control unit is a gas turbine control unit.

According to a further embodiment, the predetermined value and the predetermined time are initially defined during manufacturing of the combustion device. According to an embodiment, the definition of the predetermined value and the predetermined time are unchangeable during operation of the combustion device.

According to a further embodiment, the definition of the predetermined value and the predetermined time are changeable in a service mode of the combustion device, wherein the definition of the predetermined value and the predetermined time is altered depending on the actual operating conditions, e.g. depending on the fuel used for the combustion device. It should be noted that herein the term "predetermined value" is not limited to a specific value but also includes relative settings, e.g. increasing an actual value by a specific, predetermined percentage.

According to an embodiment, setting the ratio of the at least two different input fuel flows to a predetermined value comprises changing the ratio of the at least two different input fuel flows from a present value to the predetermined value in a stepwise manner. However, it should be understood that changing the ratio of the at least two different input fuel flows in a stepwise manner still means that the control signal is generated within the operating limits of the combustion device control unit and that the ratio of the at least two different input fuel flows is changed within the operating limits of the combustion device to which the control unit is operatively connected. In other words, according to an embodiment "stepwise" means "as fast as possible within operating limits". Anyway, "stepwise" is not to be interpreted in a mathematical sense but rather in a technical sense.

According to another embodiment, setting the ratio of the at least two different input fuel flows to a predetermined value for a predetermined time is part of a pulse shaped temporal change of the ratio of the at least two different input fuel flows, referred to as fuel ratio pulse in the following. According to an embodiment, the pulse shaped temporal change of the ratio of the at least two different input fuel flows has a predetermined pulse height and predetermined pulse width. Herein, the setting of the ratio of the at least two different input fuel flows to a predetermined value corresponds to a rising pulse edge of the fuel ratio pulse. According to an embodiment, also the falling pulse edge of the fuel ratio pulse is generated by setting the ratio of the at least two different input fuel flows from the predetermined value to a target value. In such a case of a square pulse, the pulse width corresponds to the predetermined time.

According to an embodiment, after the predetermined time the ratio of the at least two different input fuel flows is set to a value that corresponds to a control regime applied before setting the ratio of the at least two different input fuel flows to a predetermined value. For example, in an embodiment, the combustion device is controlled according to a control regime (i.e. a control method). Upon a disturbance leading to the predefined operating stage, a fuel ratio pulse is applied, wherein the ratio of the at least two different input fuel flows are set to a predetermined value for a predetermined time, and wherein after the fuel ratio pulse, e.g. after the predetermined time, the fuel ratio is again determined by the control regime. According to an embodiment, the target value of the fuel ratio pulse corresponds to a control regime applied before setting the ratio of the at least two different input fuel flows to a predetermined value.

According to an embodiment, the output signal provided by the control unit changes qualitatively in the same manner as the fuel flow ratio, e.g. in a step wise manner, in a pulsed manner, or according to any other embodiment of the herein disclosed subject matter, if it is determined that the combustion device is in the predefined operating stage.

According to an embodiment of the herein disclosed subject matter, the at least two different input fuel flows include (a) a main fuel flow to a main combustion region of a combustor of the combustion device; and (b) a pilot fuel flow to a pilot region of the combustor of the combustion device. In an embodiment, the main fuel flow generally determines the actual power of the combustion device, whereas the pilot fuel flow is used for stabilizing the flame in the combustor generated by the main fuel flow. According to an embodiment, the combustion device comprises a single combustor. According to other embodiments, the combustion device comprises two or more combustors.

According to an embodiment, the at least one operating parameter includes at least one of a temperature and a pressure. To this end, respective sensors for sensing the at least one operating parameter may be provided. The temperature may be a temperature of a part of the combustor. According to another embodiment, the temperature is a temperature of the combustion device. For example, in case the combustion device is a gas turbine, the temperature may be the temperature of an exhaust gas of the gas turbine. According to a further embodiment, the pressure is a pressure in the combustor of a combustion device.

According to a second aspect of the herein disclosed subject matter, a combustion device is provided, the combustion device comprising (i) a combustor; (ii) a combustion device control unit according to the first aspect or an embodiment thereof According to an embodiment, the at least one sensor for sensing the at least one operating parameter is part of the combustion device which includes the combustor and the combustion device control unit.

According to a further embodiment of the herein disclosed subject matter, the combustion device further comprises a fuel split device for controllably splitting a supply fuel flow into the at least two different input fuel flows to the combustor, e.g., in an embodiment, into the main fuel flow and the pilot fuel flow disclosed herein. A fuel split device comprises the advantage that the overall fuel supply to the combustion device is determined by the supply fuel flow and that the ratio of the at least two different input fuel flows is independently adjustable with the fuel split device. According to other embodiments, the at least two different fuel flows are provided by some other suitable supply arrangement.

According to a third aspect of the herein disclosed subject matter, a method of operating a combustion device control unit configured for controlling at least two different input fuel flows to a combustor is provided, the method comprising: (i) determining on the basis of at least one operating parameter whether a the combustion device is in a predefined operating stage; (ii) generating a control signal configured for setting a ratio of the at least two different input fuel flows to a predetermined value for a predetermined time in case the combustion device is in the predefined operating stage.

According to embodiments of the third aspect, the control signal is configured as disclosed with regard to the first aspect or an embodiment thereof. According to further embodiments of the third aspect, the control signal is configured in accordance with the second aspect or an embodiment thereof.

According to embodiments of the third aspect, the control signal is configured so as to set the fuel ratio of the at least two different fuel flows as disclosed with regard to the first aspect or an embodiment thereof. According to further embodiments of the third aspect, the control signal is configured so as to set the fuel ratio of the at least two different fuel flows in accordance with the second aspect or an embodiment thereof.

According to a fourth aspect of the herein disclosed subject matter, a computer program for generating a control signal is provided, the computer program, when executed by a data processor, is adapted for controlling the method according to the third aspect or an embodiment thereof.

As used herein, reference to a "computer program" is intended to be equivalent to a reference to a program element and/or a computer readable medium containing instructions for controlling a computer system to coordinate the performance of the above described method.

The computer program may be implemented as computer readable instruction code by use of any suitable programming language, such as, for example, JAVA, C++, and may be stored on a computer-readable medium (removable disk, volatile or non-volatile memory, embedded memory/processor, etc.). The instruction code is operable to program a computer or any other programmable device to carry out the intended functions. The computer program may be available from a network, such as the World Wide Web, from which it may be downloaded.

According to an embodiment, the computer program is provided in the form of a full release. According to other embodiments, the computer program is provided in the form of a software update which requires a previous installation that is updated to provide the functionality according to aspects and embodiments of the herein disclosed subject matter.

The invention may be realized by means of a computer program respectively software. However, the invention may also be realized by means of one or more specific electronic circuits respectively hardware. Furthermore, the invention may also be realized in a hybrid form, i.e. in a combination of software modules and hardware modules.

In the above there have been described and in the following there will be described exemplary embodiments of the subject matter disclosed herein with reference to a combustion device control unit and a method of operating a combustion device control unit. It has to be pointed out that of course any combination of features relating to different aspects of the herein disclosed subject matter is also possible. In particular, some embodiments have been described with reference to apparatus type claims whereas other embodiments have been described with reference to method type claims. However, a person skilled in the art will gather from the above and the following description that, unless other notified, in addition to any combination of features belonging to one aspect also any combination between features relating to different aspects or embodiments, for example even between features of the apparatus type claims and features of the method type claims is considered to be disclosed with this application.

The aspects and embodiments defined above and further aspects and embodiments of the present invention are apparent from the examples to be described hereinafter and are explained with reference to the drawings, but to which the invention is not limited.

DETAILED DESCRIPTION OF INVENTION

Figure 1:
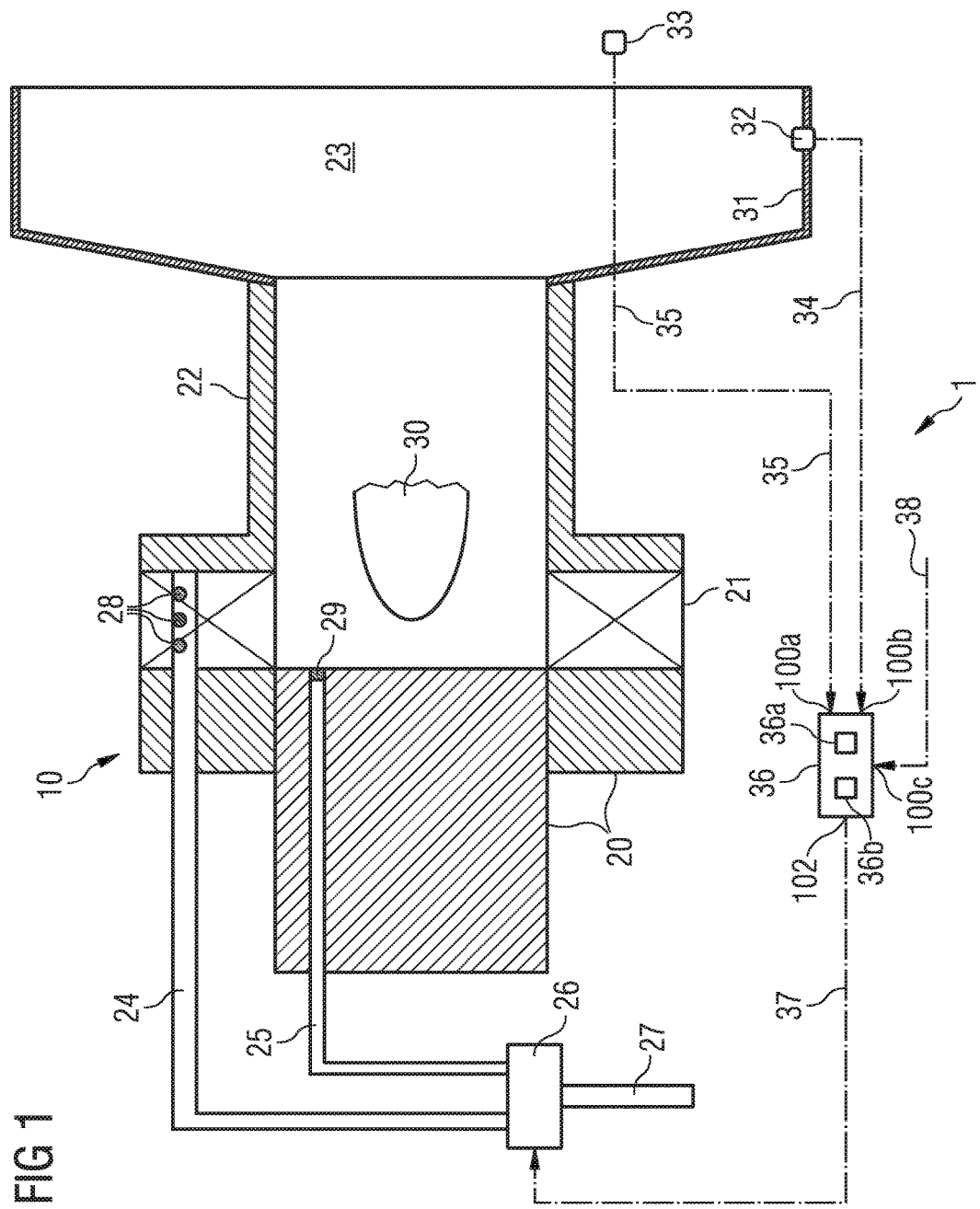
FIG. 1 schematically shows a cross section of a part of a combustion device according to embodiments of the herein disclosed subject matter.

The illustration in the drawings is schematic. It is noted that in different figures, similar or identical elements are provided with the same reference signs or with reference signs, which are different from the corresponding reference signs only within the first digit.

In the drawings, embodiments of the herein disclosed subject matter are described with reference to a combustion device in the form of a gas turbine. However, other types of combustion devices are also possible.

FIG. 1 schematically shows a part of a combustor 10 of a combustion device 1 according to embodiments of the herein disclosed subject matter. According to an embodiment, the combustor 10 comprises a front-end 20, a swirler 21, a burner pre-chamber 22 and a combustion volume 23. A main fuel flow is introduced into the swirler 21 by way of the front-end part 20 through a conduit 24. A pilot fuel flow enters the burner space through a conduit 25.

The main and pilot fuel-flows are provided by a fuel split device 26 for controllably splitting a supply fuel flow, provided via a supply conduit 27, into the main fuel flow and the pilot fuel flow. The fuel split device includes one or more valves in one embodiment. The supply fuel flow represents the total fuel supply to the combustor 10. A combustion device control unit 36 (e.g. a gas turbine control unit, hereinafter referred to as control unit) is provided for controlling the fuel split device 26.

The main fuel flow enters the swirler 21 through a main inlet 28, from where it is guided along swirler vanes (not shown in FIG. 1) and mixed with incoming compressed air fed to the swirler 21. According to an embodiment, the main inlet 28 includes a set of main fuel nozzles or injector nozzles. Downstream the swirler 21, the fuel-air mixture enters the burner pre-chamber 22.

The pilot fuel flow enters the burner pre-chamber 22 via a pilot fuel inlet 29 provided at the end of the conduit 25. The pilot fuel inlet 29 may include a single injection nozzle or a single hole in one embodiment or, according to another embodiment, a plurality of injection nozzles or holes.

The resulting air-fuel mixture maintains a burner flame 30. The hot air from this flame enters the combustion volume 23.

According to an embodiment, one or more sensors for sensing at least one operating parameter are provided. According to an embodiment shown in FIG. 1, temperature and pressure are operating parameters in the sense of the herein disclosed subject matter. To this end, a temperature sensor 32 is provided for measuring a temperature of the combustor 10 and a pressure sensor 33 is provided for measuring a pressure of the combustor 10. According to an embodiment, the temperature sensor 32 is located on a life-critical part of the combustor, e.g. on a circumferential wall 31 defining the combustion volume 23. According to a further embodiment, the pressure sensor 33 is located within the combustion volume 23.

The output of the temperature sensor 32, providing temperature information 34, and the output of the pressure sensor 33, providing pressure information 35, are fed to the control unit 36. As a further input to the control unit 36 a load information 38 is provided. The load information 38 may represent in respective embodiments a speed or a power output of a driven generator which may be connected to the shaft and driven by the shaft of the gas turbine, generated power by the driven generator, a rotational speed of a shaft of the gas turbine, or a torque provided by the shaft. According to another embodiment, the load information may also represent the mass flow exiting the combustion chamber. It may be taken from a sensor (not shown in FIG. 1) or may be derived from a further operating parameter. According to another embodiment, the load information 38 includes a combination of load information of two or more of the above mentioned embodiments.

According to an embodiment, the control unit 36 has a control input 100a, 100b, 100c for receiving at least one operating parameter indicative of the operation of a gas turbine. For the combustor 10 shown in FIG. 1 the control unit receives the operating parameters temperature information 34, pressure information 35 and load information 38.

It should be noted that these exemplary parameters are used for illustrative purposes only and that according to other embodiments other operating parameter, a subset of the exemplary operating parameters or additional operating parameters may be used by the control unit 36.

The control unit 36 further comprises a control output 102 for outputting a control signal 37 for controlling at least two different input fuel flows, e.g. the main fuel flow and the pilot fuel flow in the illustrated embodiment, to the combustor.

According to an embodiment, the control unit 36 comprises a determination unit 36a for determining whether the gas turbine is in the predefined operating stage. According to an embodiment, the determination unit 36a is configured for providing an output, indicating whether the gas turbine is in the predefined operating stage, on the basis of the output signal of the at least one sensor. According to a further embodiment, the gas turbine control unit comprises a control signal generation unit 36b for generating the control signal 37. According to an embodiment the control signal generation unit 36b is configured for generating the output signal depending on the output of the determination unit 36a.

In accordance with further embodiments, the control unit 36 is configured for generating the control signal 37 so as to set the ratio of the at least two different input fuel flows to a predetermined value for a predetermined time in case the gas turbine is in the predefined operating stage. According to an embodiment, the fuel split device 26 sets, in response to the control signal 37, the ratio of the main fuel flow and the pilot fuel flow to the predetermined value.

In accordance with embodiments of the herein disclosed subject matter, the control unit 36 is configured for determining on the basis of the at least one operating parameter whether the gas turbine is in a predefined operating stage. For example, the predefined operating stage may be an operating stage of high temperature above a temperature threshold. According to another embodiment, the predefined operating stage is an operating stage of high amplitude (above an amplitude threshold) of dynamic pressure oscillations in the combustion area of the combustor. According to other embodiments, a combination of operating parameters is used for determining whether the gas turbine is in a predefined operating stage.

Figure 2:
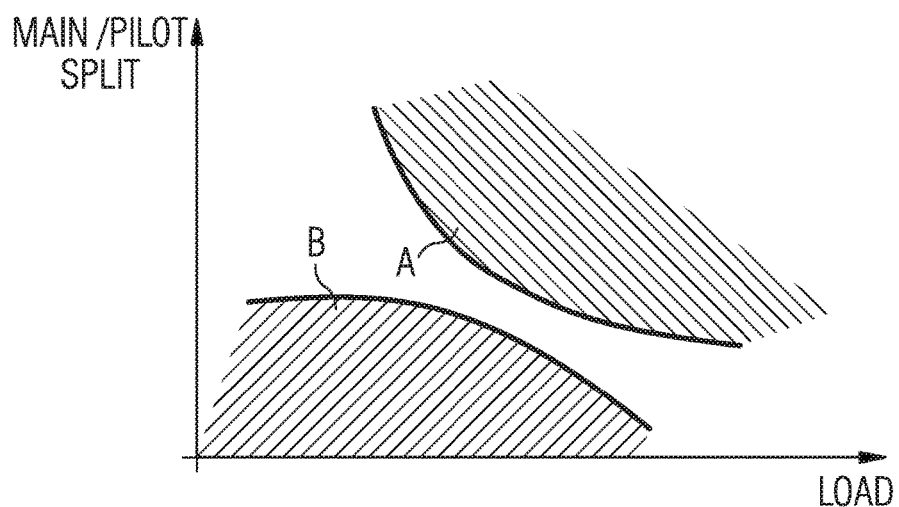
FIG. 2 schematically illustrates sets of operating parameters corresponding to predefined operating stages according to embodiments of the herein disclosed subject matter.

FIG. 2 schematically illustrates sets of operating parameters corresponding to predefined operating stages according to embodiments of the herein disclosed subject matter. FIG. 2 is a graph of main/pilot fuel split over the load of the gas turbine. The horizontal axis represents low loads of the gas turbine on the left hand side and high loads on the right hand side. The vertical axis represents a fuel split with a higher amount of the pilot fuel flow at the upper range of the vertical axis and less pilot fuel flow at the lower range of the vertical axis. The vertical axis does not show absolute values of fuel supply but the relative value of the pilot fuel supply in comparison to main fuel supply.

According to an embodiment, the hatched area referenced as A in FIG. 2 represents a set of operating conditions in which a component part of a combustor is in danger of suffering damage due to overheating. For example there may be conditions in which a specific main fuel flow to pilot fuel flow split will result in overheating of a combustor surface for a given load. According to embodiments of the herein disclosed subject matter, the control unit 36 is configured for providing an output signal 37 (see FIG. 1) so as to effect, for a given load, a division (split) between the main fuel flow and pilot fuel flow such that area A is avoided.

According to other embodiments, the control unit 36 is configured for providing an output signal 37 so as effect a ratio between the main fuel flow and the pilot fuel flow such that area B is avoided. According to an embodiment, the area B represents a set of operating conditions in which the amplitude of dynamic pressure oscillations in the combustion area is undesirably high. When such dynamic pressure oscillations exceed acceptable levels, the operation of the gas turbine and/or the mechanical longevity of the combustion system can be severely impacted.

Hence it is desirable also to be able to keep away from area B as well as from area A. This is realised according to embodiments of the herein disclosed subject matter.

Figure 3:
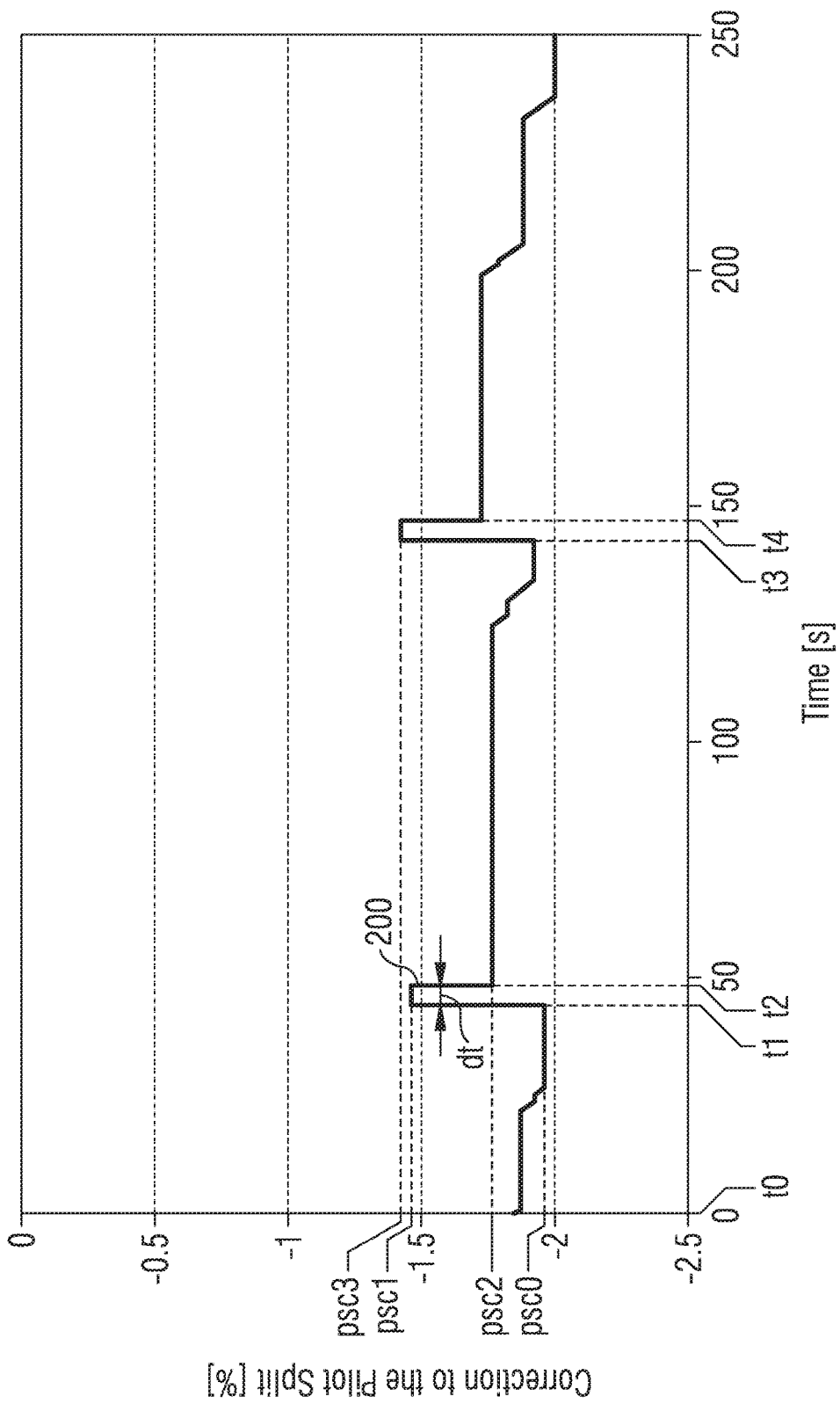
FIG. 3 illustrates the setting of the ratio of the two different input fuel flows to a predetermined value for a predetermined time according to embodiments of the herein disclosed subject matter.

FIG. 3 illustrates the setting of the ratio of the two different input fuel flows (main fuel flow and pilot fuel flow) to a predetermined value for a predetermined time according to embodiments of the herein disclosed subject matter. In particular, FIG. 3 shows a correction to a basic value of a pilot split, i.e. of the ratio between the main fuel flow and the pilot fuel flow the over time t in seconds. In FIG. 3 the vertical axis represents a fuel split with a higher amount of pilot fuel flow at the upper range of the vertical axis and less pilot fuel flow at the lower range of the vertical axis. The basic value of the pilot corresponds to a correction of 0% in FIG. 3. According to an embodiment, the basic value of the main fuel flow to pilot fuel flow ratio is an initial value that has been determined and set during manufacturing of the gas turbine. The correction to this initial value may be performed according to any suitable method or algorithm, e.g. on the basis of operating conditions, e.g. the load of the gas turbine. Such a method is referred to as a control regime for normal operation in the following and is not subject of the herein disclosed subject matter. For example the control regime for normal operation may include varying the ratio of the two different input fuel flows (main fuel flow and pilot fuel flow) depending on the load of the gas turbine, e.g. according to a pre-defined fuel split map. However, if the predefined operating condition is determined, the control regime for normal operation is no longer applied. Rather, according to an embodiment of the herein disclosed subject matter, the ratio of the main fuel flow and the pilot fuel flow is set to the predetermined value for the predetermined time.

According to an embodiment, except for the predetermined time within which the ratio of the main fuel flow and the pilot fuel flow is set to the predetermined value, the ratio of these different input fuel flows is set to a value that corresponds to the control regime employed for normal operation of the gas turbine. However, in case a predefined operating stage is reached the ratio is set to the predetermined value for the predetermined time according to embodiments of the herein disclosed subject matter. Thereafter, the ratio is again set to a value that corresponds to the control regime for normal operation.

As shown in the exemplary scenario in FIG. 3, from t=t0 to t=t1 the control unit 36 (see FIG. 1) adjusts the correction to the pilot split according to the control regime for normal operation. At t=t1 the control unit 36 determines that the gas turbine is in a predefined operating stage. The ratio between the main fuel flow and the pilot fuel flow at this time is psc0. In accordance with embodiments of the herein disclosed subject matter, the control unit 36 sets the correction to the pilot split such that the ratio of the main fuel flow and the pilot fuel flow equals a predetermined value. According to an embodiment shown in FIG. 3, setting the ratio to a predetermined value corresponds to increasing the actual ratio (i.e. the ratio before increasing it to the predetermined value) by a predetermined percentage. For example, according to an embodiment, the predetermined value is obtained by increasing the pilot fuel flow over the main fuel flow so as to achieve an increase of the actual ratio in a range of 0.1% to 1%. According to a further embodiment, the predetermined time is in a range between 0.5 second and 15 seconds. It should be understood that the predetermined values differ for different types of combustion devices. According to other embodiment, the predetermined value is obtained by increasing the actual ratio by a fixed amount. According to an embodiment, the predetermined percentage or the fixed amount, respectively, are determined based on measurements or operating conditions, e.g. the fuel used, etc. However any other method of determining the predetermined value of the ratio between the main fuel flow and the pilot fuel flow is also possible.

Having now again regard to FIG. 3, the predetermined value of the ratio between the main fuel flow and the pilot fuel flow, corresponding to a pilot split correction of psc1, is maintained for the predetermined time dt. Then, at t2=t1+dt the control regime for normal operation is used to determine the pilot split correction value psc2 for the actual operating conditions of the gas turbine at t=t2. As is apparent from FIG. 3, setting the ratio between the main fuel flow and the pilot fuel flow to the predetermined value for the predetermined time and setting the ratio between the main fuel flow and the pilot fuel flow to a value corresponding to the control regime for normal operation at t=t2 results in a fuel flow ratio pulse 200 having a pulse width of dt=t2−t1 and a pulse height of dh=psc1−psc0. Generally herein, the pulse height is defined by the predetermined value, i.e. by the rising flank of the fuel flow ratio pulse.

Between t=t2 and t=t3, the pilot split correction is determined by the control regime for normal operation. At t=t3 a predefined operating condition occurs. As a result, the control unit 36 again sets the ratio between the main fuel flow and the pilot fuel flow to a predetermined value psc3 and maintains this value for the predetermined time dt. From t=t4 on, again the ratio between the main fuel flow and the pilot fuel flow is determined by the control regime for normal operation.

According to an embodiment shown in FIG. 3, the predetermined time dt is the same for all occurrences of the predefined operating condition. According to other embodiments, the predetermined time dt depends on one or more operating parameters of the gas turbine.

A gas turbine usually comprises a number of such combustors, e.g. of the type shown in FIG. 1. In case the combustion device comprises two or more combustors, according to an embodiment the main and pilot fuel-flow distribution will be the same for a subset or for all of these combustors. According to other embodiments, each combustor is individually controlled regarding its ratio between the main fuel flow and the pilot fuel flow.

It is a common problem that, due to the high temperatures generated inside such combustors, various component parts of the combustors run the risk of overheating, which can seriously damage the combustor, or at least impair its performance. Also NOx emissions are a major concern. It is an aim of embodiments of the herein disclosed subject matter to provide a combustion apparatus which reduces the risk of such overheating and is directed to create only low emissions at a wide range of operation.

According to embodiments of the invention, any component of the gas turbine control unit, e.g. the determination unit or the control signal generation unit are provided in the form of respective computer program products which enable a processor to provide the functionality of the respective elements as disclosed herein. According to other embodiments, any component of the gas turbine control unit, e.g. the determination unit or the control signal generation unit may be provided in hardware. According to other—mixed—embodiments, some components may be provided in software while other components are provided in hardware. Further, it should be noted that a separate component (e.g. module) may be provided for each of the functions disclosed herein. According to other embodiments, at least one component (e.g. a module) is configured for providing two or more functions as disclosed herein.

It should be noted that the term "comprising" does not exclude other elements or steps and the "a" or "an" does not exclude a plurality. Also elements described in association with different embodiments may be combined. It should also be noted that reference signs in the claims should not be construed as limiting the scope of the claims.

In order to recapitulate the above described embodiments of the present invention one can state:

It is described a combustion device control unit and a combustion device, e.g. a gas turbine, which determine on the basis of at least one operating parameter whether a the combustion device is in a predefined operating stage. In response hereto, a there is generated a control signal configured for setting a ratio of at least two different input fuel flows to a predetermined value for a predetermined time in case the combustion device is in the predefined operating stage.

What is claimed is:

1. A method for operating a control unit for controlling at least two different input fuel flows to a combustion device, comprising:
   receiving at least one operating parameter through a control input of the control unit;
   determining whether the combustion device is operated in a predefined operating stage based on the at least one operating parameter; and
   generating a control signal for setting a ratio of the at least two different input fuel flows to a predetermined value for a predetermined time in case the combustion device is in the predefined operating stage,
   wherein the ratio of the at least two different input fuel flows is set to the predetermined value by changing the ratio of the at least two different input fuel flows from a present value to the predetermined value in a stepwise manner, and
   wherein the ratio of the at least two different input fuel flows is set to the predetermined value for the predetermined time comprising a pulse shaped temporal change of the ratio of the at least two different input fuel flows.

2. The method according to claim 1, wherein after the predetermined time the ratio of the at least two different input fuel flows is set to a value that corresponds to a control regime applied before setting the ratio of the at least two different input fuel flows to the predetermined value.

3. The method according to claim 1, wherein the at least two different input fuel flows include:
   a main fuel flow to a main combustion region of a combustor of the combustion device; and
   a pilot fuel flow to a pilot region of the combustor of the combustion device.

4. The method according to claim 1, wherein the at least one operating parameter comprises at least one of a temperature and a pressure.

5. The method according to claim 1, further comprising the step of controllably splitting a supply fuel flow into the at least two different input fuel flows to a combustor through the generated control signal sent to a fuel split device.

6. The method according to claim 1, wherein the combustion device comprises two or more combustors.

7. The method according to claim 6, wherein the at least two different input fuel flows distributions are the same for all of the combustors.

8. The method according to claim 6, wherein each combustor is individually controlled regarding its ratio between each of the at least two different input fuel flows.

* * * * *